US008180145B2

(12) United States Patent
Wu et al.

(10) Patent No.: US 8,180,145 B2
(45) Date of Patent: May 15, 2012

(54) METHOD FOR PRODUCING IMAGE WITH DEPTH BY USING 2D IMAGES

(75) Inventors: Jeng-Feng Wu, Chiayi County (TW); Wen-Chao Chen, Kaohsiung (TW); Cheng-Yuan Tang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 835 days.

(21) Appl. No.: 12/262,158

(22) Filed: Oct. 30, 2008

(65) Prior Publication Data
US 2009/0169057 A1      Jul. 2, 2009

(30) Foreign Application Priority Data

Dec. 28, 2007  (TW) ............................... 96151025 A

(51) Int. Cl.
*G06K 9/00*          (2006.01)
(52) U.S. Cl. .......................... 382/154; 382/103; 382/209
(58) Field of Classification Search .................... 382/154
See application file for complete search history.

(56) References Cited

U.S. PATENT DOCUMENTS

| | | | |
|---|---|---|---|
| 5,379,369 A | 1/1995 | Komma et al. | |
| 5,867,591 A | 2/1999 | Onda | |
| 6,504,569 B1 * | 1/2003 | Jasinschi et al. | 348/43 |
| 6,891,966 B2 | 5/2005 | Chen | |
| 6,965,699 B2 | 11/2005 | Jeong et al. | |
| 7,092,106 B2 * | 8/2006 | Cox et al. | 356/602 |
| 7,126,598 B2 | 10/2006 | Oh et al. | |
| 7,929,804 B2 * | 4/2011 | Avidan et al. | 382/294 |
| 7,970,170 B2 * | 6/2011 | Tener et al. | 382/103 |
| 8,086,069 B2 * | 12/2011 | Watanabe | 382/276 |
| 2004/0095999 A1 * | 5/2004 | Piehl et al. | 375/240.16 |
| 2005/0201612 A1 * | 9/2005 | Park et al. | 382/154 |
| 2006/0050335 A1 | 3/2006 | Dorrell et al. | |
| 2007/0279415 A1 * | 12/2007 | Sullivan et al. | 345/427 |
| 2007/0296721 A1 | 12/2007 | Chang et al. | |
| 2008/0278487 A1 * | 11/2008 | Gobert | 345/420 |
| 2009/0046895 A1 * | 2/2009 | Pettersson et al. | 382/106 |

OTHER PUBLICATIONS

Ming-Feng Hsieh, "Construction of a surveillance system for large monitoring spaces by a dual-camera module", National Central University, 2005, pp. 1-4.
"Office Action of Taiwan Counterpart Application", issued on Aug. 24, 2011, p. 1-p. 8, in which the listed references were cited.

* cited by examiner

*Primary Examiner* — Gregory M Desire
(74) *Attorney, Agent, or Firm* — Jianq Chyun IP Office

(57) ABSTRACT

A method for producing an image with depth by using 2D image includes obtaining a set of internal parameters of a camera. The camera takes at least a first and a second 2D images with a small shift. The first 2D image has N depths, and N≧2. Several sets of external parameters of the camera corresponding to the 2D images are estimated. A 3D information respectively corresponding to the N depths of the first 2D image at each pixel or block is calculated. A proper depth of each pixel or image block is determined. Through the internal parameters, the external parameters, and the N depths, each pixel or image block of the first 2D image is projected onto N positions of the second 2D image, so as to perform a matching comparison analysis with the second 2D image, thereby determining the proper depth from the N depths.

16 Claims, 5 Drawing Sheets

METHOD FOR PRODUCING IMAGE WITH DEPTH BY USING 2D IMAGES

CROSS-REFERENCE TO RELATED APPLICATION

This application claims the priority benefit of Taiwan application serial no. 96151025, filed on Dec. 28, 2007. The entirety of the above-mentioned patent application is hereby incorporated by reference herein and made a part of specification.

BACKGROUND OF THE INVENTION

1. Field of the Invention

The present invention generally relates to a techniques for producing an image with depth by using 2D images, capable of producing a depth of 3D image by using at least two 2D images with small shift.

2. Description of Related Art

Recently, it is easy to obtain digital 2D images as digital cameras are increasingly popularized, and digital photo apparatuses are quickly developed in recent years. Although it is still not yet for every person to possess one digital photo apparatus, the digital photo apparatuses still have widespread influence. That is to say, it can be expected that the digital photo apparatuses will replace the conventional photo apparatuses in the future. Recently, 3D related techniques become increasingly mature, and the 2D images can be converted to 3D depth image with depth information by many algorithms. However, the common problem is that it is necessary to correct the internal and external parameters of the camera before taking pictures, it is time costing, and the common user knows nothing about it. Therefore, it is practically difficult to place the pictures taken by the user in the digital photo apparatus with a 3D effect.

SUMMARY OF THE INVENTION

Accordingly, the present invention is directed to a method for producing an image with depth by using 2D images, which includes obtaining a set of internal parameters of a camera. At least two 2D images with a small shift are taken by the camera, one is used as a first 2D image, and the other one is used as a second 2D image, in which the first 2D image has N depths, and N≧2. A plurality of sets of external parameters of the camera corresponding to the 2D images is estimated. A pixel 3D information for each pixel of the first 2D image respectively corresponding to the N depths is calculated. A proper depth of each pixel is determined, in which through the internal parameters, the external parameters, and the N depths, each pixel of the first 2D image is projected onto N positions of the second 2D image, so as to perform a matching comparison analysis with the second 2D image, thereby determining the proper depth from the N depths.

The present invention is further directed to a method for producing an image with depth by using 2D images, which includes obtaining a set of internal parameters of a camera. At least two 2D images with a small shift are taken by the camera, one is used as a first 2D image, and the other is used as a second 2D image, in which the first 2D image has N depths, and N≧2. A plurality of sets of external parameters of the camera corresponding to the 2D images is estimated. The first 2D image is cut into a plurality of image blocks. A pixel 3D information for each pixel of the first 2D image respectively corresponding to the N depths is calculated. A proper depth of each image blocks is determined, in which through the internal parameters and the external parameters of the camera, and the N depths, each image block of the first 2D image is projected onto N positions of the second 2D image, so as to perform a difference analysis with the second 2D image, thereby determining the proper depth from the N depths.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
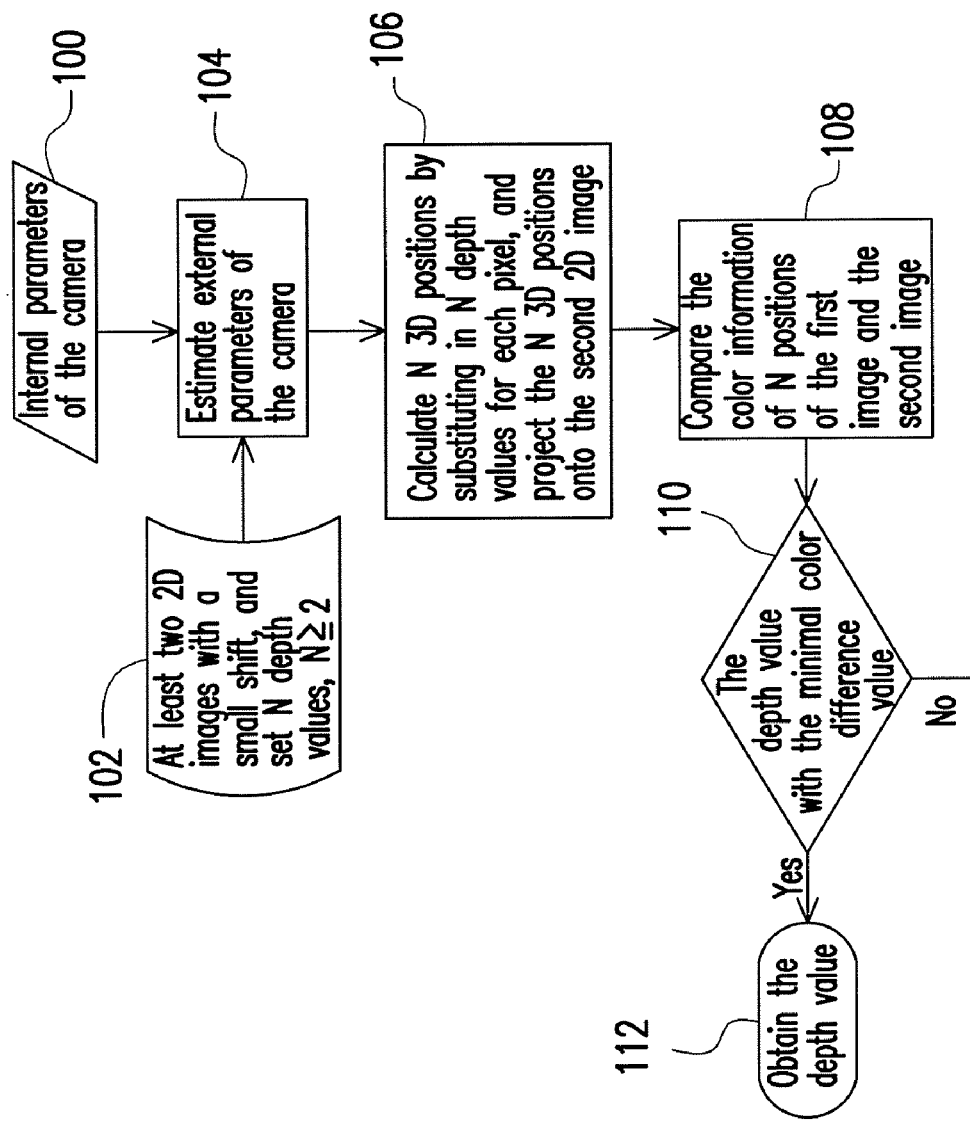
FIG. 1 is a schematic view of processes of a method for producing an image with depth by using 2D images according an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Under some situation, the camera user intends to convert simple 2D planar images to a 3D image with depth. However, for obtaining a correct depth conversion, internal and external parameters of the camera must be accurately concerned together with complicated calculation. Therefore, easy operation cannot be achieved with this method.

At least taking the easy operation and expected image depth effect into consideration, the present invention provides a processing method which is convenient in operation is provided, under a situation of not requiring quite accurate image depth. Some embodiments are given as follows to describe the present invention, but the present invention is not limited to the given embodiments.

The embodiment of the present invention approximately includes firstly correcting internal parameters of the camera. The internal parameters relate to operation set conditions of the camera, for example, lens focusing information and imaging position and size etc. Next, at least two 2D images with a small shift are taken by using a continuously taking mechanism of the camera. External parameters of the camera, for example, position and angle, are approximately estimated, and a relative depth information of an object in the 2D image is calculated by using the internal and external parameters of the camera. Although the depth information is not a correct depth, it is enough to producing a photo with 3D effect. The present invention provides a simple method, such that the front and back relation of the object in the image can be distinguished in the 2D image continuously taken by the camera, so as to produce the image with the 3D effect matching with a 3D display or photo apparatus.

More particularly, FIG. 1 is a schematic view of processes of a method for producing an image with depth by using 2D images according to an embodiment of the present invention. Referring to FIG. 1, the method provided by the present invention includes several steps. In step 100, the internal parameters of the camera are corrected. In step 102, at least two 2D images with a small shift are obtained by taking an object by the camera, one is used as the 2D image required to show the depth, and for description convenience, it is also called a first 2D image, and the scene depth is differentiated into N depth values according to the setting, and N≧2. In step 104, external parameters of the camera corresponding to each 2D image are estimated, the parameters include, for example, taking condition, and further include, for example, angle and position. In step 106, N 3D positions for each pixel of the first 2D image corresponding to different N depth values are calculated. Further, through a commonly known image projecting technology, N 2D positions are obtained by projecting the N 3D positions onto a second 2D image. Here, the second 2D image refers to the other 2D image different from the first 2D image. In step 108, the pixel information of the first 2D image is compared the pixel information correspondingly projected onto the N positions of the second 2D image.

Here, the pixel information refers to the image change of the pixel. For example, for a monochrome camera, the pixel information is brightness gray scale information, but for a color camera, a pixel is composed of sub pixels with three primary colors, so the pixel data information includes, for example, color information of the pixel. Therefore, the pixel information includes the gray scale information or the color information, and the color information is described in the following embodiments. However, for the monochrome image, the color corresponds to a single color gray scale, it is, for example, a monochrome gray scale information of white light.

In step 110, a depth value with the minimal color difference value is selected, which is the proper depth value required by this embodiment. In this manner, each pixel has a given depth value, so as to form an image with the depth information.

More detailed method is continuously described herein below. In step 100, many methods of correcting the internal parameters of the camera exist currently. After the correction is finished, the correction action is no longer required as long as the internal parameters such as the focal length of the camera keep unchanged. That is to say, the internal parameters of the camera can be obtained according to the former correction condition or the current correction condition.

In step 102, at least two 2D images with a small shift can be obtained by using the continuously taking mode of the camera, manually and continuously pressing twice, or using other manners capable of obtaining a plurality of 2D images in a short time. That is to say, because of the natural moving of the person taking the images or the moving of a dynamic scene, a slight move exists between the 2D images taken under different short times. In addition, the number N of the scene depths is determined by the accuracy and the calculation time. The more the number of the scene depths is, the higher the accuracy is, but the longer the calculation time is. However, the less the number of the scene depths is, the lower the accuracy is, and the shorter the calculation time is. Therefore, the practical value of N is set according to the requirements.

In step 104, a global coordinate system can be randomly assigned, so an origin position of the global coordinate system can be set to be the same origin as the camera coordinate system of the first 2D image, and three coordinate axes are the same. Therefore, the external parameters of the camera of the first 2D image are obtained, the camera does not rotate, a 3*3 rotation matrix R of the external parameter is a unit matrix [1 0 0; 0 1 0; 0 0 1], and a shift matrix T does not move, so it is a 1*3 vector matrix [0 0 0]. The shift between the two 2D images is small, and the taken scene does not have distinct rotation, so the external parameter R of the camera of the second 2D image can also be considered as a unit matrix [1 0 0; 0 1 0; 0 0 1]. However, for the shift matrix, the required scene depth is not necessarily correct, as long as the relative relation of the scene depth can be obtained to enable the eyes to feel the 3D effect, so the actual accurate value can be omitted. For example, a shift matrix T of the second 2D image can be set as shift vector matrixes [1 0 0], [0 1 0], and [1 1 0], or other shift amount. In the present invention, according to different conditions, the calculation is repeated, and a better set of values is selected from the results.

Because of the external parameters of the camera of the different images and the correction of the internal parameters of the camera, respective projection matrix P at two positions of the camera can be obtained, and the relation is, for example, P=KRT, in which K is the internal parameters of the camera, R is the rotation matrix of the camera, and T is the shift matrix of the camera. Those skilled in the art can understand the details, so it is not described in detail.

In step 106, in order to accelerate the estimating time of the scene depth, in this embodiment, successive depth values are differentiated into N limited depth values, N≧2, but a difference value of each depth value can be equal or not equal, which is determined according to the actual requirements. For each pixel on the first 2D image, with the projection matrix P obtained in step 104, N 3D coordinates can be obtained by respectively obtaining the corresponding N depth values, and then each 3D coordinate is projected onto N positions of the second 2D image through the projection matrix.

Figure 2:
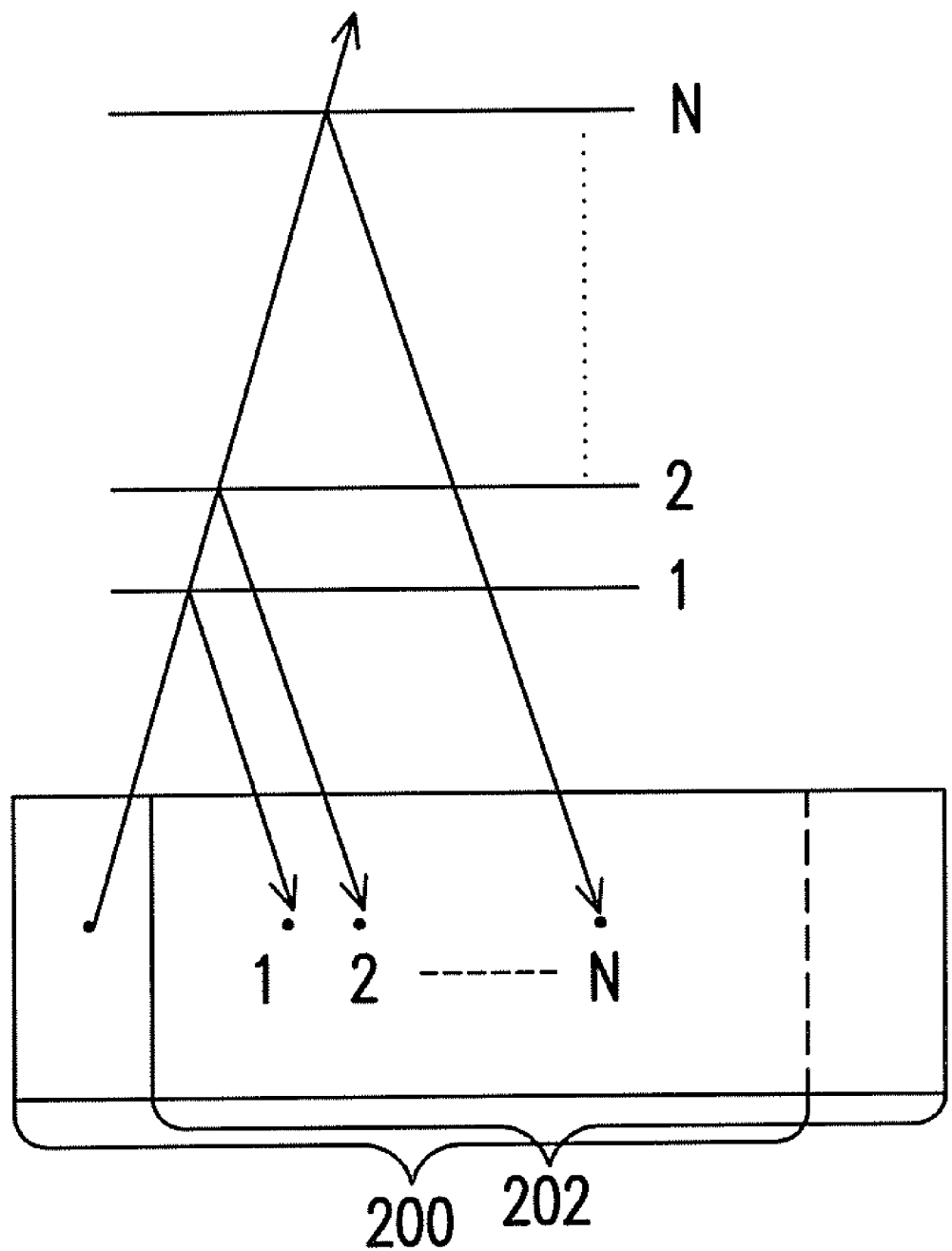
FIG. 2 is a schematic view of the projection mechanism according to the embodiment of the present invention.

FIG. 2 is a schematic view of the projection mechanism according to the embodiment of the present invention. Referring to FIG. 2, each pixel of the first 2D image 200 can be projected onto N positions of the second 2D image 202 according to taking direction and the given N different depth values.

In step 108, each pixel of the first 2D image 200 has the pixel color information. A pixel color information also exists on the position where the pixel is projected on the second 2D image 202 corresponding to different depths. If the depth is similar to the correct one, the position where the pixel is projected on the second 2D image 202 should be the same object, so the colors should be similar. Therefore, in step 110, the corresponding depth value with the most similar color information is found by comparing the color information of each pixel of the two 2D images, and it can be assumed that the depth is reliable. The reason is that the same object should have the same color. If the color difference is large, it represents that the projected position corresponds to another object, i.e., a false prediction results in a false projected position, that is to say, the 3D coordinate position is not correct. However, in this embodiment, for example, in step 112, the depth having the minimal difference value among the N depths is used as the proper depth value.

In the above embodiment, the depth value of the pixel is obtained for the pixel unit. However, for each pixel, for example, related surrounding information may be lost, and error may exist. The resolution of the current 2D image file is high, and large amount of operation is required. Therefore, in order to accelerate the calculation processing time, in another embodiment of the present invention, for example, the first 2D image file is cut into a plurality of smaller image blocks, so as to analyzing the image blocks instead of the pixels. Many algorithms of cutting into the small blocks exist, in which the simplest one is to cut the image into blocks with fixed size, for example triangular blocks or quadrangular blocks. According to the same principle of FIG. 1, when the whole block is the similar color, it represents that it may be the same object, under the best situation, the depth of the whole block can be calculated by only calculating once.

Figure 3:
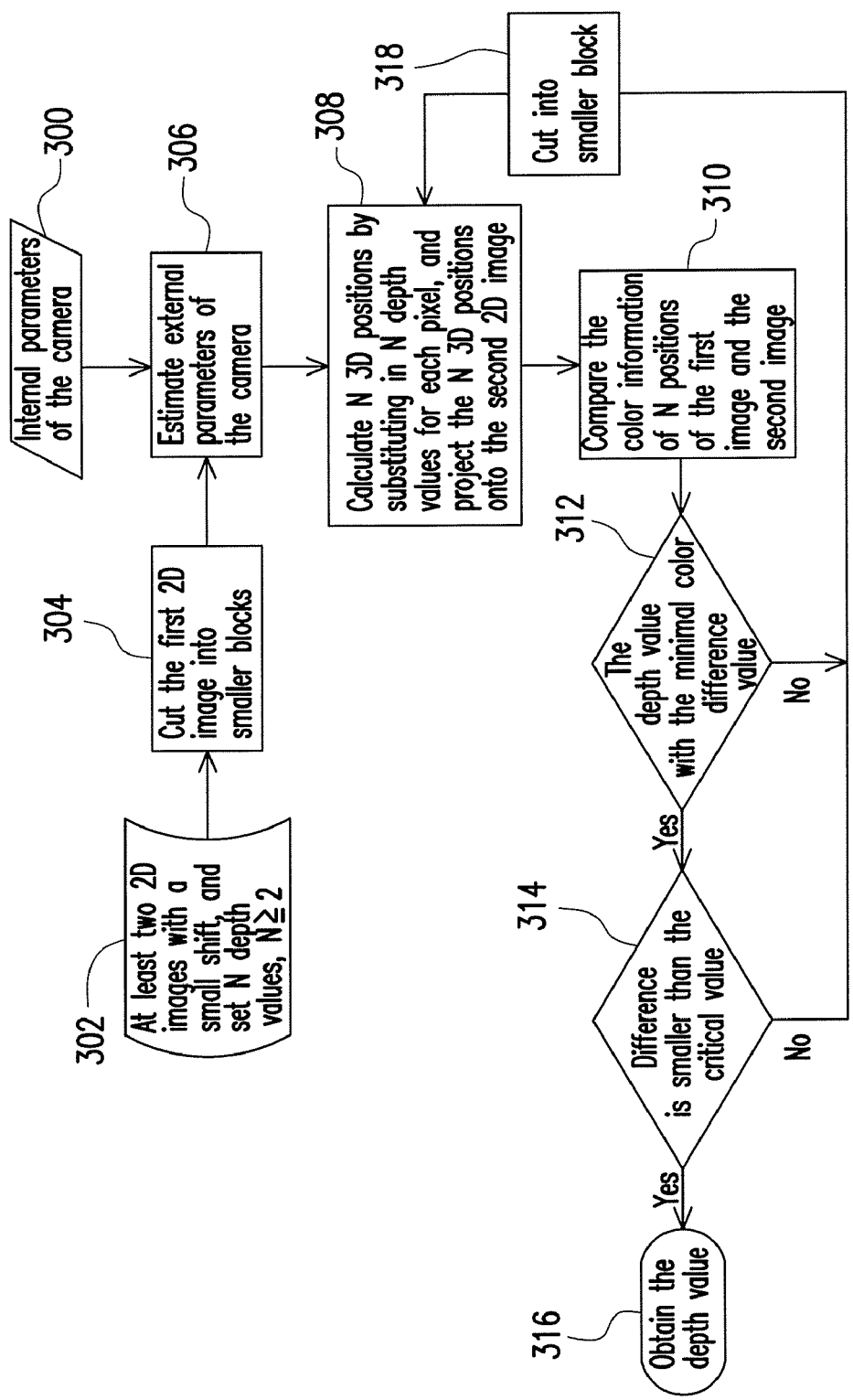
FIG. 3 is a schematic view of processes of the method for producing an image with depth by using 2D images according an embodiment of the present invention.
Figure 4:
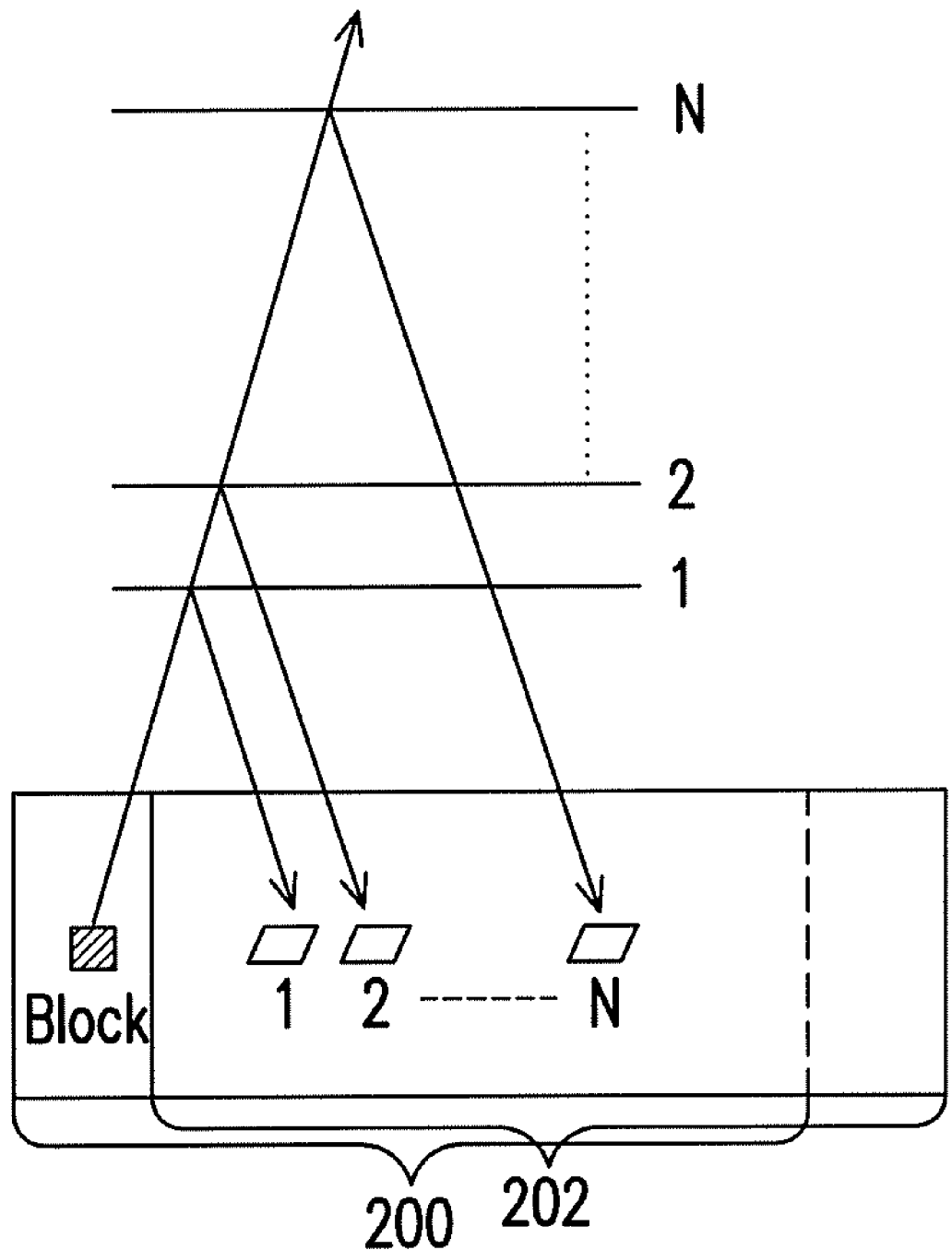
FIG. 4 is a schematic view of the projection mechanism of the image block according to the embodiment of the present invention.

FIG. 3 is a schematic view of processes of the method for producing an image with depth by using 2D images according an embodiment of the present invention. Referring to FIG. 3, in step 300, internal parameters of the camera are corrected. In step 302, at least two 2D images with a small shift are obtained by taking an object by the camera, one is used as the 2D image required to show the depth, and it is also called the first 2D image, and the scene depth is differentiated into N depth values according to the setting, and N≧2. In step 304, the first 2D image is cut into a plurality of image blocks. In step 306, through commonly known image projecting technology, N 3D positions are projected onto the second 2D image for each image block of the first 2D image, so as to obtain N 2D positions. FIG. 4 is a schematic view of the image block projection mechanism according to the embodiment of the present invention. Referring to FIG. 4, the so-called image block projection is similar to the pixel projection mechanism, except that the image block is used as the considering region, so the blocks of the first 2D image 200 may be projected onto different blocks on the second 2D image 202 according to different depth values. The color information of the image block is, for example, the average color, in which the color information may further consider the brightness matching degree etc.

In step 310, the color information of the block of the first 2D image is compared with the color information of the block correspondingly projected onto N positions of the second 2D image. In step 312, the depth value with the minimal color difference value is selected. In this embodiment, the calculation is performed with the image block as a unit, so if the image block has big change, for example, at the edge region of the object, event if the depth value with the minimal difference is obtained, it is impossible to really represent the large depth change. Therefore, in step 314, whether the color difference degree is smaller than a critical value is inspected. In step 316, if the color difference degree is smaller than a critical value, the depth value is used as the proper depth value. If the color difference degree exceeds the critical value, the image block is re-cut in step 318. Next, the procedure returns to step 308 to continue to find the depth values of the image blocks after being re-cut.

Figure 5:
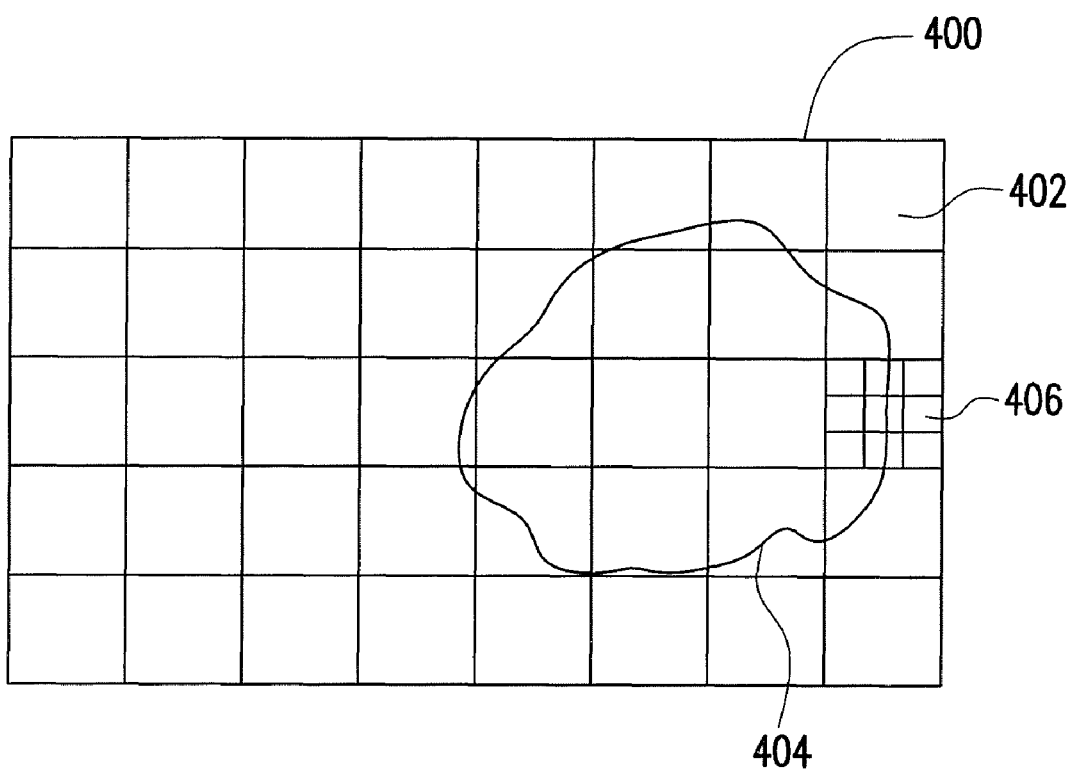
FIG. 5 is a schematic view of the re-cutting mechanism of the image block according to an embodiment of the present invention.

The mechanism of re-cutting the image of the step 314 is described as follows. FIG. 5 is a schematic view of the re-cutting mechanism of the image block according to an embodiment of the present invention. Referring to FIG. 5, for example, the first 2D image 400 has an object 404, and is cut into a plurality of image blocks 402. If one of the blocks has a significantly larger degree of color difference, it represents that the block still has many image information with large changes. Therefore, for example, the block is re-cut into smaller image blocks 406. Generally speaking, the edge of the object 404 has larger scene depth change, and thus, for example, the re-cutting more likely occurs on the edge. The cutting manner of FIG. 5 is only an embodiment, and cutting shapes and sizes can be set according to actual accuracy requirements.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of producing an image with depth by using 2D images, implemented in an image processing apparatus, comprising:
    providing a set of internal parameters of a camera and a set of 2D images to the image processing apparatus, wherein the image processing apparatus performs:
    taking at least two 2D images from the set of 2D images with a small shift when taken by the camera, using one as a first 2D image, and the other one as a second 2D image, wherein the first 2D image has N depths, and N≧2;
    estimating a plurality of sets of external parameters of the camera respectively corresponding to the 2D images;
    calculating a pixel 3D information for each pixel of the first 2D image respectively corresponding to the N depths; and
    determining a proper depth of each pixel, wherein through the set of internal parameters, the plurality of sets of external parameters, and the N depths, the pixels of the first 2D image are projected onto N positions of the second 2D image, so as to perform a matching comparison analysis with the second 2D image, thereby determining the proper depth from the N depths.

2. The method of producing an image with depth by using 2D images according to claim 1, wherein estimating the sets of external parameters of the camera respectively corresponding to the 2D images comprises:
    estimating a rotation matrix of the camera corresponding to the first 2D image;
    estimating a shift matrix of the camera corresponding to the first 2D image;
    estimating a rotation matrix of the camera corresponding to the second 2D image; and
    estimating a shift matrix of the camera corresponding to the second 2D image.

3. The method of producing an image with depth by using 2D images according to claim 2, wherein the rotation matrix of the first 2D image is identical to the rotation matrix of the second 2D image.

4. The method of producing an image with depth by using 2D images according to claim 2, wherein the shift matrix of the first 2D image is set as an origin, and the shift matrix of the second 2D image comprises an unit vector at a shift direction.

5. The method of producing an image with depth by using 2D images according to claim 1, wherein the step of determining the proper depth of each pixel comprises comparing the pixel information of each pixel of the first 2D image with a pixel information of the pixel respectively projected on a plurality of corresponding positions of the second 2D image corresponding to N depths, and using a depth with the most similar pixel information among the N depths as the proper depth.

6. The method of producing an image with depth by using 2D images according to claim 1, wherein taking the at least two 2D images with the small shift is obtained by a user through a continuously taking manner, wherein the small shift is the shift naturally produced by natural moving or by moving a scene.

7. The method of producing an image with depth by using 2D images according to claim 1, wherein the proper depth of each pixel is used for qualitatively displaying 3D effect.

8. A method for producing an image with depth by using 2D images, implemented in an image processing apparatus, comprising:

providing a set of internal parameters of a camera and a set of 2D images to the image processing apparatus, wherein the image processing apparatus performs:

taking at least two 2D images from the set of 2D images with a small shift when taken by the camera, using one as a first 2D image, and the other one as a second 2D image, wherein the first 2D image has N depths, and N≧2;

estimating a plurality of sets of external parameters of the camera respectively corresponding to the 2D images;

cutting the first 2D image into a plurality of image blocks;

calculating a block 3D information for each pixel of the first 2D image respectively corresponding to the N depths; and determining a proper depth of each image block, wherein through the set of internal parameters, the plurality of sets of external parameters, and the N depths, the image block of the first 2D image are projected onto N positions of the second 2D image, so as to perform a difference analysis with the second 2D image, thereby determining the proper depth from the N depths.

9. The method of producing an image with depth by using 2D images according to claim 8, further comprising:

when performing the difference analysis on each image block and the second 2D image, if a difference degree exceeds a set value, cutting the image block into smaller blocks, and repeating the corresponding steps, so as to respectively obtain a plurality of corresponding proper depths.

10. The method of producing an image with depth by using 2D images according to claim 8, wherein estimating the sets of external parameters of the camera respectively corresponding to the 2D images comprises:

estimating a rotation matrix of the camera corresponding to the first 2D image;

estimating a shift matrix of the camera corresponding to the first 2D image;

estimating a rotation matrix of the camera corresponding to the second 2D image; and estimating a shift matrix of the camera corresponding to the second 2D image.

11. The method of producing an image with depth by using 2D images according to claim 10, wherein the rotation matrix of the first 2D image is identical to the rotation matrix of the second 2D image.

12. The method of producing an image with depth by using 2D images according to claim 10, wherein the shift matrix of the first 2D image is set as an origin, and the shift matrix of the second 2D image comprises an unit vector at a shift direction.

13. The method of producing an image with depth by using 2D images according to claim 8, wherein the step of determining the proper depth of each image block comprises comparing the pixel information of each image block of the first 2D image with a pixel information of the image block respectively projected on a plurality of corresponding positions on the second 2D image corresponding to N depths, so as to obtain a difference value of the pixel information, and using a depth with the minimal difference value of the pixel information among the N depths as the proper depth.

14. The method of producing an image with depth by using 2D images according to claim 13, further comprising:

if a difference degree of the pixel information is larger than a set value, cutting the image block into smaller blocks, and repeating the corresponding steps, so as to respectively obtain a plurality of corresponding proper depths.

15. The method of producing an image with depth by using 2D images according to claim 8, wherein taking the at least two 2D images with the small shift is obtained by a user through a continuously taking manner, wherein the small shift is the shift naturally produced by natural moving or by moving a scene.

16. The method of producing an image with depth by using 2D images according to claim 8, wherein the proper depth of each image block is used for qualitatively displaying 3D effect.

* * * * *